United States Patent [19]

Suzuki et al.

[11] Patent Number: 4,724,455
[45] Date of Patent: Feb. 9, 1988

[54] EXPOSURE CONTROLLING MEANS FOR A VARIABLE FOCUS TYPE CAMERA

[75] Inventors: Kiziro Suzuki; Yasushi Hoshino; Masamori Makino, all of Hachioji, Japan

[73] Assignee: Konishiroku Photo Industry Co., Ltd., Tokyo, Japan

[21] Appl. No.: 815,879

[22] Filed: Jan. 3, 1986

[30] Foreign Application Priority Data

Jan. 11, 1985 [JP] Japan ................................. 60-3643
May 24, 1985 [JP] Japan ............................. 60-110544

[51] Int. Cl.[4] ........................................... G03B 7/097
[52] U.S. Cl. ................................. 354/412; 354/421; 354/435
[58] Field of Search ..................... 354/412, 421, 435

[56] References Cited

U.S. PATENT DOCUMENTS 4,355,873 10/1982 Carcia ................................. 354/421
4,401,373 8/1983 Nalsai ................................. 354/412
4,427,276 1/1984 Feinerman et al. ................. 354/412
4,492,450 1/1985 Watanabe et al. .................. 354/412

Primary Examiner—Michael L. Gellner
Attorney, Agent, or Firm—Jordan B. Bierman

[57] ABSTRACT

An exposure control device for a camera capable of changing f numbers having a device for detecting an f number of a taking lens which constitutes factor A, a photometering device for detecting brightness of a subject as factor B, a device for detecting film speed as factor C, a memory containing a plurality of exposure values adapted to be addressed by a value of at least one factor selected from the group consisting of A, B, and C wherein the exposure values are predetermined by varying the value of the one factor and assuming the non-selected factor is constant, and a control device for determining a difference between a detected value and the assumed constant value of the non-selected factor, correcting the address of the exposure value based on the difference, and reading the corrected exposure value.

10 Claims, 8 Drawing Figures

EXPOSURE CONTROLLING MEANS FOR A VARIABLE FOCUS TYPE CAMERA

BACKGROUND OF THE INVENTION

1. Field of the Invention

This invention relates to a camera capable of changing one focal length of the taking lens thereof into another and, particularly, to a variable focus type camera employing a programmed shutter capable of changing an open aperture value of the taking lens into another when a focal length of the camera is changed into another. More particularly, this invention relates to an exposure controlling means and an electronic flash controlling means each for the variable focus type camera so improved as to make a proper exposure and flash timing with a substantially less storage of memories.

Generally, a variable focus type camera is so constructed that the lens system thereof is moved or an auxiliary lens system is attached or detached with moving the main lens system, so that a focal length f of a taking lens may be changed. On the other hand, as is publicly known, in a lens of which principal point coincides with the position of the exit pupil thereof, the following relation can be held good;

$$D/f = 1/F$$

wherein D represents the diameter of an exit pupil, f represents a focal length of a taking lens, and F represents an F number.

Figure 6:
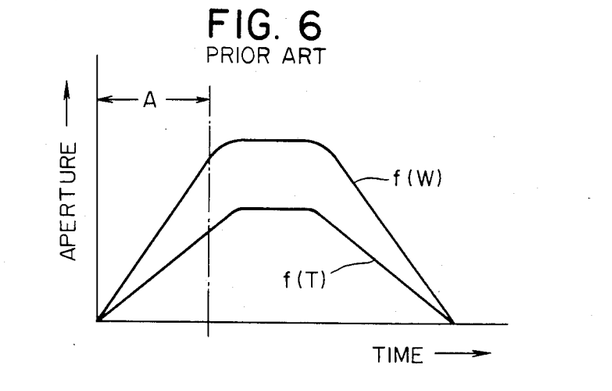
FIG. 6 is a graph displaying the difference between the exposure amounts when using a binary-focus type camera.

Generally in a variable focus type camera having a built-in aperture unit, the abovementioned relation teaches that there is a difference in F number between a short focus lens f(W) and a long focus lens f(T), even if their aperture diameters are the same. In other words, an exposure amount applied onto a film surface when using a f(W) is different from that when using a f(T), even if the shutter speed conditions are the same. FIG. 6 illustrates the above description, wherein it is indicated that the exposure amounts applied onto film surfaces are different from each other when the exposures are made through an electromagnetic programmed shutter under the same shutter speed conditions, i.e., the same exposure time conditions, because F numbers are different from each other when making exposures.

In a camera having a conventional type variable focal lens, an aperture mechanism or the like has been provided to the front of the AE photoreceptor of the camera so as to be changed the aperture values or switched over a filter density, in accordance with the aperture values of the taking lens which are varied according to the changes of the focal length of the taking lens aperture values of a taking lens when the focal length of the lens is changed, and exposures have been compensated. This has made such cameras complicated to construct. On the other hand, in a variable focus type camera using a programmed shutter which makes automatic exposures in accordance with the memory of the shutter speeds corresponding to subject brightness, it has been required to make an automatic exposures in such a manner that the individual tables corresponding to the focal lengths of f(W), f(T) or the other are memorized and the table corresponding to a focal length is called up.

In a camera having an aperture-shutter combination, an exposure amount for electronic flash photography may be controlled by variously changing such an aperture size as indicated by the aperture size variation curve in such a process of opening a shutter as indicated by A in FIG. 6. This has also been publicly known.

In the case that an exposure amount for electronic flash photography is controlled by the moment of starting a flash emission, as mentioned above, it may be considered to take the same means as mentioned above when using a variable focus type camera.

However, in a variable focus type camera, it is necessary to prepare a time table of starting each electronic flash emission for every focal length, so that a large number of memories should be stored.

OBJECTS AND SUMMARY OF THE INVENTION

It is an object of the invention to provide an exposure-control means for variable focus cameras, whereby automatic exposures can be performed without any complicated mechanism and any storage of a large number of memories. Another object of the invention is to provide a controlling means for controlling an electronic flash timing without requiring any complicated mechanism and any storage of a large number of memories.

This invention is to achieve the abovementioned objects, and the objects of the invention can be achieved by an exposure-control means for variable focus cameras, in which an aperture value is varied according to the change of a focal length, such exposure control means characterized in that a photometered value is shifted, according to the switch-over of focal lengths, on a built-in table of the exposure-control means, which registered thereon the corresponding relation between the photometered values and shutter speeds.

To achieve the objects, the invention is to provide an electronic flash control means for variable focus type cameras capable of changing an aperture value in accordance with the changes of a focal length, said electronic flash control means comprising a table provided thereon with photographying distances and electronic flash timing values each corresponding to the values of film speeds, wherein said flash timing values are shifted to the direction of changing a film speed according to the difference between the open aperture values of a variable focal lens, when a focal length is switched over.

BRIEF DESCRIPTION OF THE DRAWINGS

FIGS. 1(*a*) and (*b*) illustrate the states where a short focal point and a long focal point are used to a binary-focus type camera, respectively;

DESCRIPTION OF THE PREFERRED EMBODIMENTS

Figure 1A:
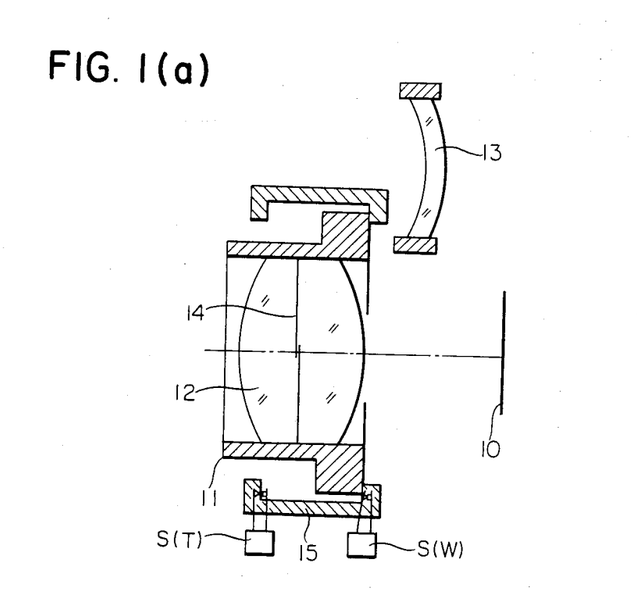
Figure 1B:
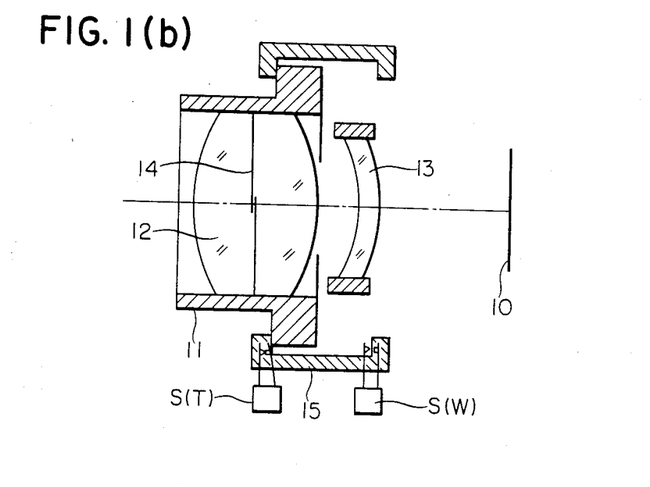

FIG. 1 illustrates a binary-focus type camera which is an example of variable-focus cameras; FIG. 1(a) illustrates such a state that the focal length of a lens is shortened to a short focal point f(W) by pushing lens barrel 11 into the camera-body side; and FIG. 1(b) illustrates such a state that the focal length of a lens is made to a long focal point f(T) by pulling lens barrel 11 out from the camera, wherein 10 indicates the surface of film.

A taking lens comprises a main lens system 12 and interposable auxiliary lens system 13 interposable into the main lens system 12 each attached to lens barrel 11. When the lens barrel 11 is pushed in, the auxiliary lens system 13 will escape from the optical path of the taking lens to from a short-focus lens f(W), and when the lens barrel 11 is pulled out, the auxiliary lens system 13 is on the optical path to form a long-focus lens f(T) together with the main lens system 12. Further, a shutter means 14 capable of serving also as an aperture is arranged to the inside of the main lens system 12.

Lens barrel 11 reciprocates along a guide member 15 on the optical path of the taking lens to switch a focal length to the other. Micro-switches S(W) and S(T) are provided to the guide member 15 to switch the micro-switch S(W) over to ON when the lens is in a position of a short-focus lens f(W), and to switch the micro-switch S(T) over to ON when the lens is in a position of a long-focus lens f(T), respectively. F number of the lens at open aperture is F:3.3 in the case of the short-focus lens f(W) and F:5.8 in the case of the long-focus lens f(T). There is a difference of 1⅔ in terms of exposure values (EV) corresponding to an ISO 100 film.

Figure 2:
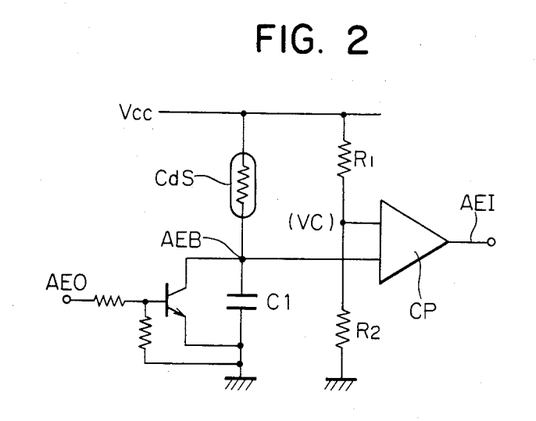
FIG. 2 shows a circuit diagram of an example of a photometric means used in the invention.

FIG. 2 is a schematic diagram illustrating an example of the photometering circuits which may be used in the invention which is so designed as to detect a subject brightness in such a manner that a photoreceptor, CdS, is provided face to face with a subject and capacitor C1 is cleared, and then a charged time TLS required for charging the cleared capacitor C1 up to a prescribed voltage VC.

Figure 3:
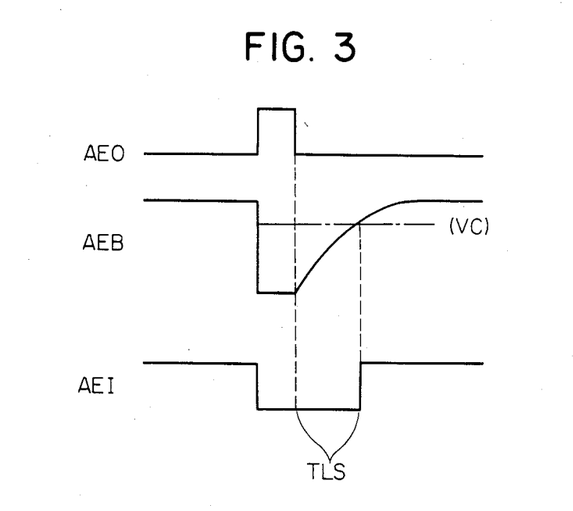
FIG. 3 illustrates the states of both input and output of each terminal shown in FIG. 2.

FIG. 3 illustrates the output voltage of each section shown in FIG. 2. A time TLS required for reversing a signal AEI is measured in such a manner that a pulse signal is put out by switching ON the first step swtich S1 of a shutter release button to AEO section to clear the capacitor C1 and then to start changing, and when a voltage of the capacitor C1 is raised up to a prescribed voltage VC, the signal AEI is reversed by a comparator CP, so as to count a time (photometered time) necessary for reversing the signal AEI from the time of starting a charge to capacitor C1.

Table 1 exhibits an example of the relations among a photometered time TLS, a light-value (LV) corresponding thereto at a film-speed of ISO 100, and photometric zones AET segmenting the LV by a certain width, wherein ΔTLSs denoted by the differences in parentheses represent the respective ranges.

TABLE 1

| Photometric zone AET | LV (ISO 100) | Photometered time TLS (Difference) (Unit: ms) |
|---|---|---|
| 0 | ~16 5/6 | ~0.92 (0.92) |
| 1 | 16 5/6~16 3/6 | 0.92~1.05 (0.13) |
| 2 | 16 3/6~16 1/6 | 1.05~1.19 (0.14) |
| 3 | 16 1/6~15 5/6 | 1.19~1.35 (0.16) |
| 4 | 15 5/6~15 3/6 | 1.35~1.53 (0.18) |
| 5 | 15 3/6~15 1/6 | 1.53~1.74 (0.21) |
| 6 | 15 1/6~14 5/6 | 1.74~1.97 (0.23) |
| 7 | 14 5/6~14 3/6 | 1.97~2.24 (0.27) |
| 8 | 14 3/6~14 1/6 | 2.24~2.54 (0.30) |
| 9 | 14 1/6~13 5/6 | 2.54~2.89 (0.35) |
| 10 | 13 5/6~13 3/6 | 2.89~3.28 (0.39) |
| 11 | 13 3/6~13 1/6 | 3.28~3.72 (0.44) |
| 12 | 13 1/6~12 5/6 | 3.72~4.23 (0.51) |
| 13 | 12 5/6~12 3/6 | 4.23~4.80 (0.57) |
| 14 | 12 3/6~12 1/6 | 4.80~5.45 (0.65) |
| 15 | 12 1/6~11 5/6 | 5.45~6.19 (0.74) |
| 16 | 11 5/6~11 3/6 | 6.19~7.03 (0.84) |
| 17 | 11 3/6~11 1/6 | 7.03~7.98 (0.95) |
| 18 | 11 1/6~10 5/6 | 7.98~9.06 (1.08) |
| 19 | 10 5/6~10 3/6 | 9.06~10.29 (1.23) |
| 20 | 10 3/6~10 1/6 | 10.29~11.69 (1.40) |
| 21 | 10 1/6~9 5/6 | 11.69~13.27 (1.58) |
| 22 | 9 5/6~9 3/6 | 13.27~15.07 (1.80) |
| 23 | 9 3/6~9 1/6 | 15.07~17.11 (2.04) |
| 24 | 9 1/6~8 5/6 | 17.11~19.43 (2.32) |
| 25 | 8 5/6~8 3/6 | 19.43~22.06 (2.63) |
| 26 | 8 3/6~8 1/6 | 22.06~25.05 (2.99) |
| 27 | 8 1/6~7 5/6 | 25.05~28.45 (3.40) |
| 28 | 7 5/6~7 3/6 | 28.45~32.30 (3.85) |
| 29 | 7 3/6~7 1/6 | 32.30~36.68 (4.38) |
| 30 | 7 1/6~6 5/6 | 36.68~41.65 (4.97) |
| 31 | 6 5/6~6 3/6 | 41.65~47.29 (5.64) |
| 32 | 6 3/6~6 1/6 | 47.29~53.70 (6.41) |
| 33 | 6 1/6~5 5/6 | 53.70~60.98 (7.28) |
| 34 | 5 5/6~5 3/6 | 60.98~69.24 (8.26) |

Table 2 exhibits an example of shutter speeds TAE (Time necessary for operating shutter blades in the opening director) corresponding to photometric zones AET in the case of using short focus f(W). In the table, the shutter speeds TAE shown therein represent those used when an ISO 100 speed film is used. Memory means 5 shown in FIG. 4 houses a table indicating the relations between photometric zones AET and shutter speeds TAE, which are shown in Table 2.

TABLE 2

| Photometric zone (AET) | LV (ISO 100) | Shutter speed (TAE) (Unit: ms) |
|---|---|---|
| 0 | 17 | 4.70 |
| 1 | 16⅔ | 5.10 |
| 2 | 16⅓ | 5.42 |
| 3 | 16 | 5.84 |
| 4 | 15⅔ | 6.30 |
| 5 | 15⅓ | 6.90 |
| 6 | 15 | 7.40 |
| 7 | 14⅔ | 8.00 |
| 8 | 14⅓ | 8.50 |
| 9 | 14 | 9.20 |
| 10 | 13⅔ | 9.80 |
| 11 | 13⅓ | 10.50 |
| 12 | 13 | 11.30 |
| 13 | 12⅔ | 12.20 |
| 14 | 12⅓ | 13.00 |
| 15 | 12 | 14.00 |
| 16 | 11⅔ | 15.20 |
| 17 | 11⅓ | 16.30 |
| 18 | 11 | 17.60 |
| 19 | 10⅔ | 19.40 |
| 20 | 10⅓ | 22.00 |
| 21 | 10 | 25.00 |
| 22 | 9⅔ | 29.00 |
| 23 | 9⅓ | 33.60 |
| 24 | 9 | 36.30 |
| 25 | 8⅔ | 41.60 |
| 26 | 8⅓ | 47.80 |
| 27 | 8 | 54.40 |

As is obvious from the above table, the photometric zones AET are segmented in accordance with an APEX system (additive system of photographic exposure), by every ⅛EV step. Generally, an exposure value Ev is related to a subject brightness Lv and an ISO film speed in terms of apex indexes, by the following equation:

$$Ev = Lv + Sv$$

The inventors added thereto also with the information Fv of the indexes, Fv(W) and Fv(T), indicating the effective apertures of a lens of every focal lengths to provide the following apex equation with every step of ⅛Ev:

$$Ev = Lv + Sv + Fv$$

In this example, F number of a lens at open aperture is F:3.3 in the case of f(W) or F:5.8 in the case of f(T), and there is a difference of 3/5EV between the above two lenses. Therefore, Fv(T) will be 5, provided that Fv(W) is zero. Accordingly, the following equations may be effected:

$$Ev(W) = Lv + Sv + 0 \text{ \{In the case of f}(W)\}$$

$$Ev(T) = Lv + Sv + 5 \text{ \{In the case of f}(T)\}$$

In this example, therefore, an automatic exposure AE can be performed with a variable focus type camera having a programmed shutter without storing any large amount of memories therein in such a manner that a built-in table of an exposure-control means, registering the relations between photometric values and shutter speeds, is shifted 5-stepwise according to the switch-over of a focal length.

Figure 4:
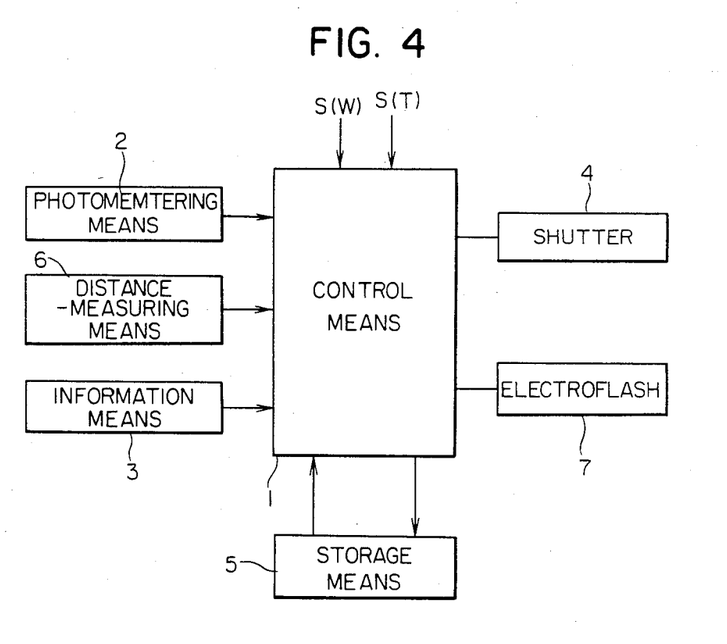
FIG. 4 illustrates the basic block diagram of the invention.

FIG. 4 is a basic block diagram illustrating this invention. The exposure-control means is controlled by a controlling means 1 such as an IC or the like arranged to the inside of the camera. A subject brightness information given by the aforementioned photometric means 2 is fed into the controlling means 1. Information means 3 feeds the ISO speed information of a loaded film. In a camera compatible of using a DX system film, the ISO speed information thereof is automatically read from the loaded film cartridge thereof and is then fed into the controlling means 1.

In shutter mechanism 4, an aperture, which jointly serves as an aperture, is gradually opened up to full-aperture from the closed position at a command given from the controlling means 1, and is then switched over to close the blades thereof by a shutter-closing signal given by the controlling means 1.

The controlling means 1 gives the shutter unit 4 an instruction of a shutter time from opening the shutter to closing it in accordance with a segmented subject brightness information given from photometric means 2, an ISO film speed information given from information means 3 and an information given from switch S(W) or S(T) instructing that a pciture-taking is to be made with the use of a lens in a focal length out of the aforementioned f(W) and f(T). For this purpose, the controlling means 1 has a memory means 5 which memorized the table shown in Table 2.

In the binary-focus type camera of the example, it is, by nature, required to provide thereto with both of a table applicable to f(W) and a table applicable to f(T). In the invention, however, it is made good enough for the invention only to memorize either one of the tables respectively applicable to f(W) and f(T). Table 3 exhibits shutter speeds in the form of a table, set on the basis of the ISO speeds and the brightness information with respect to a lens f(W). This table covers from EV8 to EV17, and Table 3 shows a part (EV13~16) thereof. In Table 3, the figures in the parentheses indicate the above-mentioned segmented zones in terms of every ⅛EV step, in the apex system.

TABLE 3

| | EV value | | | (Unit: ms) |
|---|---|---|---|---|
| ISO speed | 16 (3) | 15 (6) | 14 (9) | 13 (12) |
| 25 (0) | 9.20 | 11.30 | 14.00 | 17.60 |
| 32 (1) | 8.50 | 10.50 | 13.00 | 16.30 |
| 40 (2) | 8.00 | 9.80 | 12.20 | 15.20 |
| 50 (3) | 7.40 | 9.20 | 11.30 | 14.00 |
| 64 (4) | 6.90 | 8.50 | 10.50 | 13.00 |
| 80 (5) | 6.30 | 8.00 | 9.80 | 12.20 |
| 100 (6) | 5.84 | 7.40 | 9.20 | 11.30 |
| 125 (7) | 5.42 | 6.90 | 8.50 | 10.50 |
| 160 (8) | 5.10 | 6.30 | 8.00 | 9.80 |
| 200 (9) | 4.70 | 5.84 | 7.40 | 9.20 |
| 250 (10) | 4.38 | 5.42 | 6.90 | 8.50 |
| 320 (11) | 4.00 | 5.10 | 6.30 | 8.00 |
| 400 (12) | 3.68 | 4.70 | 5.84 | 7.40 |
| 500 (13) | 3.32 | 4.38 | 5.42 | 6.90 |
| 640 (14) | 3.00 | 4.00 | 5.10 | 6.30 |
| 800 (15) | 3.00 | 3.68 | 4.70 | 5.84 |
| 1000 (16) | 3.00 | 3.32 | 4.38 | 5.42 |
| 1250 (17) | 3.00 | 3.00 | 4.00 | 5.10 |
| 1600 (18) | 3.00 | 3.00 | 4.68 | 4.70 |

When a taking lens is in the conditions of f(W), the shutter speeds are determined according to the contents of Table 2, and an exposure is to be made. When the taking lens is switched over to f(T) in this example, the lens is slowed down in keeping with 1⅜EV. As shown in Table 3, the ISO speeds are provided into a built-in program of a controlling means so that they may be shifted stepwise at every ⅛EV, it is, therefore, possible to make an exposure in such a manner that the ISO speed of a film which is to be practically used is shifted to 5 steps lower and the shutter speed corresponding to the lowered ISO speed is read. In the case that a picture was taken with an ISO 200 film by making use of a lens f(W) and the lens f(W) is then switched over to a lens f(T), a proper shutter speed may be determined to take the next picture by shifting the ISO film speed to ISO 64. If not according to the shift of an ISO speed, but according to the table shown in Table 2, it is also allowed to shift to increase a photometric zone by 5 steps.

The same may also be appicable to the case that an electronic flash photography using an electronic flash having a prescribed guide number is to be made according to a distance measurement information. A camera-to-subject distance measured by a distance measuring means 6 is segmented into 15 AF zones, for example. Table 4 exhibits a part (corresponding to AF zones 4, 5, 6 and 7) of the table corresponding to ISO speed indexes, effective aperture indexes of a lens and distance measurement information indexes, similar to relation between the aforementioned photometeric zones and shutter speeds. The relation of ISO zones and AF zones to shutter speeds may be shifted in accordance with the built-in program of the controlling means. This will be described later.

TABLE 4

| ISO speed | AF zone (Unit: ms) | | | |
|---|---|---|---|---|
| | 4 | 5 | 6 | 7 |
| 25 (0) | 18.00 | 18.00 | 18.00 | 15.90 |
| 32 (1) | 18.00 | 18.00 | 15.90 | 14.26 |
| 40 (2) | 18.00 | 18.00 | 14.26 | 12.64 |
| 50 (3) | 18.00 | 15.90 | 12.64 | 11.30 |
| 64 (4) | 18.00 | 14.26 | 11.30 | 10.06 |
| 80 (5) | 15.90 | 12.64 | 10.06 | 9.00 |
| 100 (6) | 14.26 | 11.30 | 9.00 | 8.04 |
| 125 (7) | 12.64 | 10.06 | 8.04 | 7.18 |
| 160 (8) | 11.30 | 9.00 | 7.18 | 6.34 |
| 200 (9) | 10.06 | 8.04 | 6.34 | 5.62 |
| 250 (10) | 9.00 | 7.18 | 5.62 | 5.04 |
| 320 (11) | 8.04 | 6.34 | 5.04 | 4.50 |
| 400 (12) | 7.18 | 5.62 | 4.50 | 4.00 |
| 500 (13) | 6.34 | 5.04 | 4.00 | 3.56 |
| 640 (14) | 5.62 | 4.50 | 3.56 | 3.20 |
| 800 (15) | 5.04 | 4.00 | 3.20 | 3.20 |
| 1000 (16) | 4.50 | 3.56 | 3.20 | 3.20 |
| 1250 (17) | 4.00 | 3.20 | 3.20 | 3.20 |
| 1600 (18) | 3.56 | 3.20 | 3.20 | 3.20 |

According to Table 4, an electronic flash timing is selected to AF zones and ISO speeds, shutter unit 4 keeps open after receiving a command of opening the shutter until the shutter speed indicated in the table is completed and, at this moment, the electronic flash 7 fires and the shutter unit is to be closed.

For example, When using a lens f(W) and an ISO 400 film and taking a picture of a subject positioned at a distance in AF zone 5, a flash emission and a photographing are performed in an electronic flash timing of 5.62 ms. When switching the focal length of the taking lens over to f(T) to take a picture of the same subject, the electronic flash timing is switched over to 10.06 ms, that is, 5 steps in the ISO zones are shifted to ISO speed of 125.

In addition to the above, the invention can be embodied in an electronic flash photography using a program capable of performing a daylight-flash synchronization. In this case, the computation is carried out in accordance with Tables 3 and 4, however, a closer-aperture priority system is adopted therein. To be more concrete, this sytem is adopted in such a manner that the shutter speeds shown in Table 3 determined by photometric means 2 are compared with the electronic flash timing shown in Table 4 determined by distance measuring means 6 to find the shorter shutter speed, so that an exposure is made in priority of the shorter shutter speed and both of an electronic flashing and a shutter closing may simultaneously be operated at this shutter speed. In this case too, a taking lens may be switched from f(W) over to f(T) by shifting the ISO speed zones of a film with the equivalent to the difference between the open aperture values, in accordance with Tables 3 and 4.

A binary-focus type camera of the example of the invention is described above. In a multi-focus type camera of the invention, on the other hand, a proper exposure can be made, regardless of the changes in the focal distances of the taking lens thereof, by shifting an ISO speed table of the relations between photometric values and shutter speeds in accordance with the changes of the open aperture value of the lens.

Figure 5:
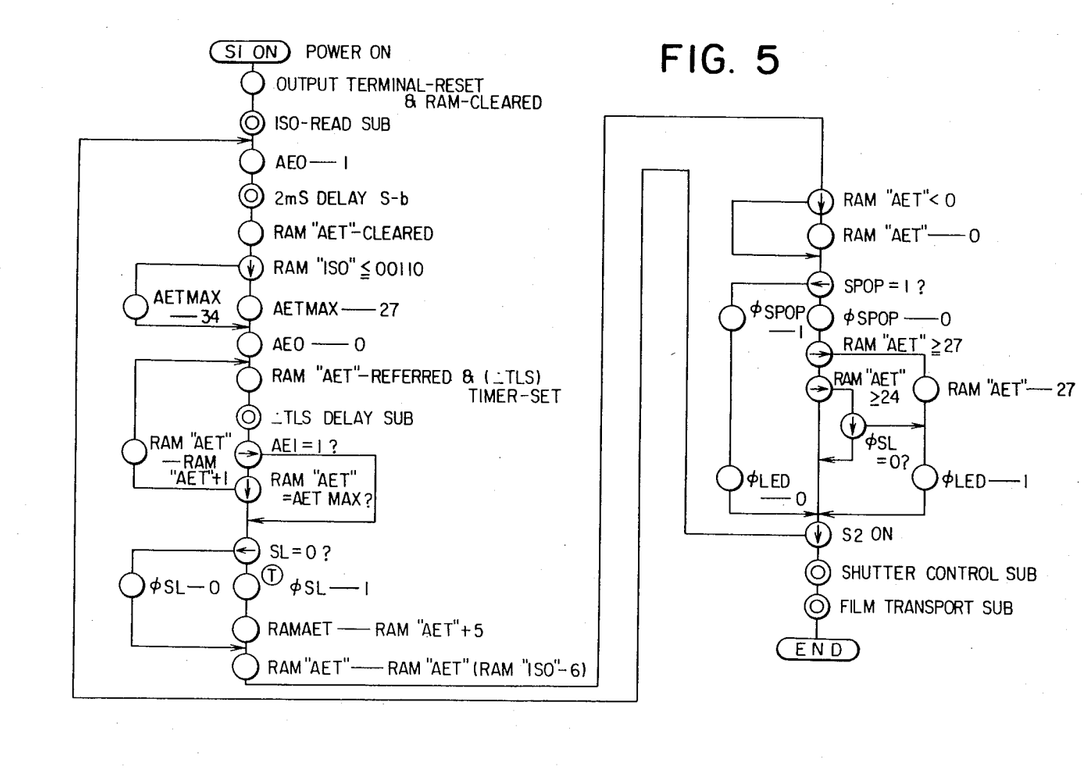
FIG. 5 illustrates the flow chart of the invention.

FIG. 5 shows an example of the exposure flow charts for the binary-focus type cameras of the invention. Wherein, a RAM is cleared by switching the first stage switch S1 of a shutter releasing button ON so as to read at first the ISO speed of a loaded film. When the ISO speed of the film is ISO 100 or lower, a photometric vlaue AET is set to MAX 34. Next, the controlling circuit switches the AEO shown in FIG. 1 OFF to start charging capacitor C1, so as to commence an integration.

Now, a timing is set to 0.92 ms by a photometric zone value AET1. When an AEI does not reverse after the timing is set to 0.92 ms, the photometric zone value AET is added with +1, and further added with 0.13 ms as a TLS, and after then, it is checked up whether the AEI is reversed or not. When the AEI is still not reversed, the photometric zone value AET is further added with +1, and this is to be repeated, if necessary.

In photometric zone value AET 5, for example, the AET is reversed, the AET 5 is resultantly set. If the AEI remains unreversed as it is, the photometric zone value AET is repeatedly added up to a maximum that is in this example, 27 when using a film of not higher than ISO 100 and 34 when using a film of higher than ISO 100.

Next, an SL information, i.e., a focal length information, is fed. When a short forcal point detecting switch S(W) is switched ON, there gives a flag of $\phi SL=0$ with $SL=0$, and, when a long focal point detecting switch S(T) is switched ON, there gives a flage of $\phi SL=1$ with $SL=1$ and, in this example, the photometric zone RAM 'AET' is shifted by +5. The binary-focus lens is switched over from one to the other by shifting the table and is processed with the same RAM table.

Next, a film speed zone relative to ISO speed 100 as a standard is shifted in such a manner that the RAM 'ISO' of the ISO speed zone (see FIG. 3) of a loaded film after subtracting 6 therefrom is subtracted from the RAM 'AET' of the photometric zone. When the RAM 'AET' of this shifted photometric zone is not more than '0', it is to be processed as '0', because it goes outside the table. In the abovementioned process, a photometric zone AET containing an ISO speed information and a lens information in a natural light photography may be set.

Successively, a POP information, i.e., an electronic flash photographic information, is processed. When an electronic flash switch is ON, that is, SPOP=1, so as to take picture with an electronic flash, the photographying mode is in an electronic flash photographying mode ($\phi$ SPOP=1) so that a low luminance warning lamp may not be lit. ($\phi$LED←0).

In an AE photographying mode (SPOP=0) and when a photometric zone RAM 'AET' is not less than 27 or the equivalent thereof (that is, a shutter speed at EV8), there makes no further photometry but makes a low luminance warning. ($\phi$LED←1).

Even when the photometric zone RAM 'AET' is 24 (that is, a shutter speed at EV9) or higher, or the equivalent thereto, a low luminance warning will similarly be made, provided that a taking lens is in the state of f(T) and ($\phi$LED←1).

When the second stage switch S2 of the shutter release button is switched ON in such a state as mentioned above, a proper exposure can be performed at a shutter speed TAE selected in accordance with both of the photometric zone provided by the abovementioned steps and the built-in table of memorizing means 5, which is shown in Table 2. If the swtich S2 cannot be switched ON, the abovementioned flow is to be repeated.

In this particular example, the difference in the open apertures between the f(W) lens and the f(T) lens was set at 1⅝EV and the steps of the table were segmented by every 1⅛EV. it is, however, suitable that the ISO speed zones and photometric zones in a table may be graduated stepwise so as to be shifted.

Next, a further description will be made in more detail about the electronic flash controlling means for the variable focas type camera, with reference to another example of the invention.

speed index, as shown in Table 5, that is another example of the tables to be stored, exhibiting the flash timing values for an f(W) lens, in which the EFISO zones in the left column are segmented stepwise by every ⅓EV. (EV means an exposure value).

TABLE 5

| EFISO zone | ISO W | ISO T | 19.20 (AF 12) | 6.2 (11) | 4.48 (10) | 3.51 (9) | 2.89 (8) | 2.46 (7) | 2.14 (6) | 1.90 (5) | 1.71 (4) | 1.55 (3) | 1.42 (2) | 1.32 (1) | 1.22 (0) (Unit: ms) |
|---|---|---|---|---|---|---|---|---|---|---|---|---|---|---|---|
| 0 |  | 25 | 38.0 | 38.0 | 38.0 | 38.0 | 38.0 | 38.0 | 38.0 | 38.0 | 38.0 | 38.0 | 38.0 | 38.0 | 38.0 |
| 1 |  |  |  |  |  |  |  |  |  |  |  |  |  |  |  |
| 2 |  |  |  |  |  |  |  |  |  |  |  |  |  |  | 38.0 |
| 3 |  | 50 |  |  |  |  |  |  |  |  |  |  |  | 38.0 | 30.0 |
| 4 |  |  |  |  |  |  |  |  |  |  |  | 38.0 | 38.0 | 30.0 | 28.2 |
| 5 | 25 |  |  |  |  |  |  |  |  |  | 38.0 | 30.0 | 30.0 | 28.2 | 26.5 |
| 6 |  | 100 |  |  |  |  |  |  |  | 38.0 | 30.0 | 28.2 | 28.2 | 26.5 | 25.0 |
| 7 |  |  |  |  |  |  |  |  | 38.0 | 30.0 | 28.2 | 26.5 | 26.5 | 25.0 | 23.7 |
| 8 | 50 |  |  |  |  |  |  | 38.0 | 30.0 | 28.2 | 26.5 | 25.0 | 25.0 | 23.7 | 22.6 |
| 9 |  | 200 |  |  |  |  |  | 30.0 | 28.2 | 26.5 | 25.0 | 23.7 | 23.7 | 22.6 | 21.0 |
| 10 |  |  |  |  |  |  | 38.0 | 28.2 | 26.5 | 25.0 | 23.7 | 22.6 | 22.6 | 21.0 | 18.5 |
| 11 | 100 |  |  |  |  |  | 30.0 | 26.5 | 25.0 | 23.7 | 22.6 | 21.0 | 21.0 | 18.5 | 16.9 |
| 12 |  | 400 |  |  |  | 38.0 | 28.2 | 25.0 | 23.7 | 22.6 | 21.0 | 18.5 | 18.5 | 16.9 | 16.2 |
| 13 |  |  |  |  |  | 30.0 | 26.5 | 23.7 | 22.6 | 21.0 | 18.5 | 16.9 | 16.9 | 16.2 | 15.6 |
| 14 | 200 |  |  |  | 38.0 | 28.2 | 25.0 | 22.6 | 21.0 | 18.5 | 16.9 | 16.2 | 16.2 | 15.6 | 15.2 |
| 15 |  | 800 |  |  | 30.0 | 26.5 | 23.7 | 21.0 | 18.5 | 16.9 | 16.2 | 15.6 | 15.6 | 15.2 | 14.8 |
| 16 |  |  |  | 38.0 | 28.2 | 25.0 | 22.6 | 18.5 | 16.9 | 16.2 | 15.6 | 15.2 | 15.2 | 14.8 | 14.4 |
| 17 | 400 |  |  | 30.0 | 26.5 | 23.7 | 21.0 | 16.9 | 16.2 | 15.2 | 14.8 | 14.8 | 14.4 |  |  |
| 18 |  | 1600 |  | 28.2 | 25.0 | 22.6 | 18.5 | 16.2 | 15.6 | 15.2 | 14.8 | 14.4 | 14.4 |  |  |
| 19 |  |  |  | 26.5 | 23.7 | 21.0 | 16.9 | 15.6 | 15.2 | 14.8 | 14.4 |  |  |  |  |
| 20 | 800 |  |  | 25.0 | 22.6 | 18.5 | 16.2 | 15.2 | 14.8 | 14.4 |  |  |  |  |  |
| 21 |  |  |  | 23.7 | 21.0 | 16.9 | 15.6 | 14.8 | 14.4 |  |  |  |  |  |  |
| 22 |  |  |  | 22.6 | 18.5 | 16.2 | 15.2 | 14.4 |  |  |  |  |  |  |  |
| 23 | 1600 |  | 38.0 | 21.0 | 16.9 | 15.6 | 14.8 | 14.4 | 14.4 | 14.4 | 14.4 | 14.4 | 14.4 | 14.4 | 14.4 |

Figure 7:
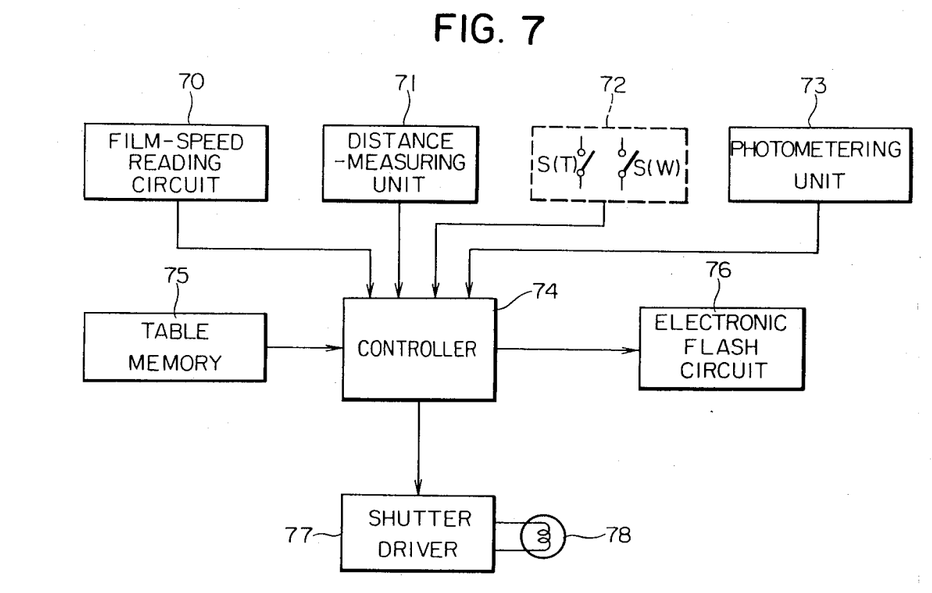
FIG. 7 illustrates an example of the basic block diagram of the invention, which is similar to that shown in FIG. 4.

FIG. 7 is a block diagram illustrating an electronic flash controlling means of the invention applied to a varialbe focus type camera, wherein reference numeral 70 indicates a film-speed reading circuit for reading an ISO speed information from a film cartridge for DX system film use; 71 is a distance measuring unit for feeding an information corresponding to a distance from a camera to a subject; 72 indicates the switches each for a focal length corresponding to the microswitch S(W) or S(T) shown in FIG. 1(b); 73 indicates a photometering unit comprising CdS or the like for putting out a subject brightness information; 74 indicates a controller comprising a microcomputer capable of computing both of a shutter speed from a shutter opening command to a shutter closing command and the value of a flash timing from the shutter opening command to an electronic flash starting command, and also capable of giving both of a sutter closing signal and an electronic flash emitting signal, in accordance with the aforementioned ISO speed information, a distance-to-subject information, a focal length information, and a subject brightness information; 75 indicates a table memory stored the relations between ISO speeds and flash timings, in the form of a table; 76 indicates an electronic flash circuit; and 77 indicates a shutter driver for driving an electromagnetically driven shutter 78. A distance to be measured by distance measuring unit 71 from a lens to a subject is segmented into a plurality of AF zones, e.g., 15 AF zones. Accordingly, table memory 75 stores in advance a table showing the relations between the AF zones and the flash timing values denoted by ms for every ISO The flash timing values each shown in this table are the values produced by controller 74. as for one of the examples, the controller 74 will count the time from the point of time when a shutter opening signal is given so that an electronic flashing command may be given with a timing shown in the table. It is also allowed to embody another example in such a manner that a sensor such as a switch or the like is provided in advance for detecting the start of shutter blade operating and a time counting is started by a signal given from the sensor so that an electronic flashing command may be given with a timing shown in the table below.

When the ISO speed index of a film used is automatically read by a film speed reading circuit 70, a distance to a subject is measured by distance measuring unit 71, and a focal length information is given from a focal length information generating switch 72 on which lens is to be used, a short focus lens f(W) or a long focus lens f(T), controller 74 starts to read a corresponding flash timing value from the built-in flash timing table of the table memory 75. For example, in the case that a short focus lens f(W) and a film of ISO speed 400 are used to take picture of a subject at a distance corresponding to AF zone 5, a flash timing value of 15.6 ms is selected to send an electronic flash signal at that timing to electronic flash circuit 76, so that an electronic flash may be fired.

When switching the taking lens over to a long focus lens f(T) to take picture of the same subject, a signal to that effect is given from the focal length information generating switch 72. The open aperture of the taking lens is F:3.3 in the case of the short focus lens f(W) and F:5.8 in the case of the long focus lens f(T), and the taking lens is therefore darkened by 1⅔EV in terms of EV value. Accordingly, controller 74 will shift an ISO speed index on the flash timing table shown in Table 5 to the direction of 5 steps lower in the EFISO zone. In the abovementioned example, 22.6 ms of the flash timing value that corresponds to 125 of the ISO speed index is read and, at this timing, an electronic flash signal is sent.

As mentioned above, when switching a taking lens over between a short focus lens f(W) and a long focal point f(T), a proper exposure can be obtained by only shifting a flash timing value to the direction that an ISO speed is changed by the euivalent to the difference between the open aperture values.

The above description is concerned with a camera capable of switching the two focal lengths thereof over from one to the other. Also, in a camera capable of switching the two or more focal lengths thereof over to each other, however, a proper exposure can be performed, regardless of the changes in the focal lengths of a taking lens, by shifting a film speed table of the corresponding relations to the changes of the open aperture of a taking lens between an ISO speed index and a electronic flash timing value.

According to this invention, even in a variable focus type camera using a programmed shutter, the memorizing means thereof does not need to store a number of tables indiscriminately and, in addition, a proper exposure can be performed in any conditions of a selected long or short focal point lens, and a proper flash timing in electronic flash photography.

What is claimed is:

1. An exposure control device for a camera capable of changing f number comprising
   1. a means for detecting an f number of a taking lens which constitutes factor A,
   2. a photometering means for detecting brightness of a subject as factor B,
   3. a means for detecting film speed as factor C,
   4. a memory containing a plurality of exposure values adapted to be addressed by a value of at least one factor selected from the group consisting of A, B, and C, said exposure values being predetermined by varying the value of said at least one factor and assuming the non-selected factor is constant, and
   5. a control means for determining a difference between a detected value and the assumed constant value of said non-selected factor, correcting the address of said exposure value based on said difference, and reading the corrected exposure value.

2. The device of claim 1 comprising an exposure adjusting means which is preprogrammed to adjust an aperture size in predetermined relation to an operating time, and wherein said control means controls said operating time of said exposure adjusting means in accordance with the corrected exposure value.

3. The device of claim 1 comprising an exposure adjusting means having a predetermined aperture size, said control means controlling an exposure time of said exposure adjusting means in accordance with said corrected exposure value.

4. The device of claim 1 comprising an exposure adjusting means acting during a predetermined time, said control means controlling an aperture size in accordance with said corrected exposure value.

5. The device of claim 1 wherein said means for detecting an f number comprises a switch adapted to detect a change in lens configuration.

6. The device of claim 1 wherein factors A, B, C, and said exposure values are represented by APEX index.

7. An exposure control device for a camera capable of changing f number comprising
   1. a means for detecting an f number of a taking lens as factor A,
   2. a means for detecting film speed as factor C,
   3. a means for detecting a guide number of a flash lamp as factor D,
   4. a distance measuring means for detecting a camera to subject distance as factor E,
   5. a memory containing a plurality of exposure values adapted to be addressed by a value of at least one factor selected from the group consisting of A, C, D, & E, said exposure values being predetermined by varying the value of said at least one factor and assuming the non-selected factor is constant, and
   6. a control means for determining a difference between a detected value and the assumed constant value of said non-selected factor, correcting the address of said exposure value based on said difference, and reading the corrected exposure value.

8. The device of claim 7 comprising an exposure adjusting means which is preprogrammed to adjust an aperture size in predetermined relation to an operating time, and wherein said control means controls said opeating time of said exposure adjusting means in accordance with the corrected exposure value.

9. An exposure control device for a camera capable of changing f numbers comprising
   1. a means for detecting an f number of a taking lens as factor A,
   2. a photometering means for detecting brightness of a subject as factor B,
   3. a means for detecting film speed as factor C,
   4. a means for detecting a guide number of a flash lamp as factor D,
   5. a distance measuring means for detecting a camera to subject distance as factor E,
   6. a memory containing first and second kinds of exposure values,
      a. said first kind adapted to be addressed by a value of a first reference factor which is at least one factor selected from A, B, and C, said first kind being predetermined by varying the value of said first reference factor while assuming that a first non-selected factor is constant, and
      b. said second kind adapted to be addressed by value of a second reference factor which is at least one factor selected from A, C, D, and E, said second kind being predetermined by varying the value of said second reference factor while assuming that a second non-selected factor is constant, and
   7. a control means for determining a difference between a detected value and the assumed constant value of said first non-selected factor, correcting the address of said first reference factor based on said difference, and reading the corrected first exposure value,
   8. said control means also determining a difference between the detected value and the assumed constant value of said second non-selected factor, correcting the address of said second reference factor based on said difference, and reading the corrected second exposure value, wherein said control means compares said corrected first exposure value and said corrected second exposure value, and selects one of said corrected first or second exposure values in accordance with a predetermined condition.

10. The device of claim 9 comprising an exposure adjusting means which is preprogrammed to adjust an aperture size in predetermined relation to an operating time, both said corrected first and second exposure values represent said operating time, and said control means selects one of said corrected first and second exposure values so that said aperture size is smaller and fires said flash lamp after said smaller aperture size is obtained.

* * * * *